United States Patent
Zeng et al.

(10) Patent No.: US 10,567,041 B2
(45) Date of Patent: Feb. 18, 2020

(54) HIGH DYNAMIC RANGE NFC READER MODE RECEIVER

(71) Applicant: Apple Inc., Cupertino, CA (US)

(72) Inventors: Xinping Zeng, San Jose, CA (US); Peter M. Agboh, Burlingame, CA (US); Vusthla Sunil Reddy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 15/788,688

(22) Filed: Oct. 19, 2017

(65) Prior Publication Data
US 2019/0058507 A1    Feb. 21, 2019

Related U.S. Application Data (60) Provisional application No. 62/547,727, filed on Aug. 18, 2017.

(51) Int. Cl.
*H04B 5/00* (2006.01)
*H04L 7/04* (2006.01)

(52) U.S. Cl.
CPC ............. *H04B 5/0062* (2013.01); *H04L 7/04* (2013.01)

(58) Field of Classification Search
CPC ................................. H04B 5/0062; H04L 7/04
See application file for complete search history.

(56) References Cited

U.S. PATENT DOCUMENTS

| | | | | |
|---|---|---|---|---|
| 4,630,204 A | * | 12/1986 | Mortara | A61B 5/0464 128/901 |
| 2003/0210659 A1 | * | 11/2003 | Chu | H04W 88/181 370/320 |
| 2009/0161740 A1 | * | 6/2009 | Wenske | H04B 17/15 375/221 |
| 2011/0096883 A1 | * | 4/2011 | Bae | H04L 7/042 375/359 |
| 2014/0266414 A1 | * | 9/2014 | Kim | G05F 1/468 327/543 |
| 2015/0071394 A1 | * | 3/2015 | Miyanaga | H04L 7/04 375/362 |
| 2015/0318979 A1 | * | 11/2015 | Ciacci | H04L 7/0276 375/358 |

(Continued)

OTHER PUBLICATIONS

Kiayanini et al., "Adaptive Nonlinear RF Cancellation for Improved Isolation in Simultaneous Transmit-Receive Systems", IEEE, Aug. 2017, pp. 1-10 (Year: 2017).*

*Primary Examiner* — Lewis G West
(74) *Attorney, Agent, or Firm* — Morgan, Lewis & Bockius LLP (57) ABSTRACT

A transceiver that implements a high dynamic range NFC reader mode receiver may include a transmitter circuit to generate a transmit (TX) signal for communication to a first device via an antenna. The transceiver may further include a receiver circuit that is in communication with the first device via the antenna. The receiver circuit includes a mixer circuit and an adder circuit. The mixer circuit mixes a carrier signal with a first signal to generate a baseband signal. The adder circuit is coupled to the antenna and produces the first signal by adding a receive (RX) signal with a second signal to reduce a component of the TX signal included in the RX signal. The second signal is produced by processing a TX clock signal generated by the transmitter circuit.

20 Claims, 4 Drawing Sheets

(56) References Cited

U.S. PATENT DOCUMENTS

| | | | |
|---|---|---|---|
| 2016/0156342 A1* | 6/2016 | Yun | H03K 7/08 |
| | | | 327/158 |
| 2016/0241280 A1* | 8/2016 | Van der Goes | H04B 1/10 |
| 2017/0111191 A1* | 4/2017 | Midya | H04L 25/061 |
| 2018/0101502 A1* | 4/2018 | Nassif | G06F 9/3869 |
| 2018/0102151 A1* | 4/2018 | Kim | G06F 1/12 |

* cited by examiner

FIG. 6 ced by the manufactures or be encoded
HIGH DYNAMIC RANGE NFC READER MODE RECEIVER

CROSS-REFERENCE TO RELATED APPLICATIONS

This application claims the benefit of priority under 35 U.S.C. § 119 of U.S. Provisional Patent Application No. 62/547,727, filed Aug. 18, 2017, which is incorporated herein by reference in its entirety.

TECHNICAL FIELD

The present description relates generally to wireless communications, and more particularly, to a high dynamic range near-field communication (NFC) reader mode receiver.

BACKGROUND

Near field communication (NFC) enabled devices such as mobile phones can establish communication with another device by touching the other device or being moved into close proximity with the other device. The other device can be as another mobile device, an NFC reader, such as a payment kiosk, or an NFC tag. NFC enabled devices have to be present within a relatively small distance from one another to allow information exchange through electromagnetic induction between their corresponding loop antennas. Ranges of up to several centimeters (e.g., up to about 10 cm) are common for many NFC devices. A first NFC device may transmit a magnetic field modulated with the information to be exchanged, such as credit card information for payment in a contactless financial transaction, or ticket fare information in an electronic ticketing transaction. A second NFC device nearby may receive the information via inductive coupling, and may respond to the first NFC device by transmitting or generating its own modulated magnetic field and inductively coupling this magnetic field to the first NFC device.

In another mode of operation, an NFC-enabled device may operate as an NFC reader and/or writer and communicate with an NFC tag, which is a passive data store that can be read, and under certain conditions, written to by an NFC device. NFC tags have no power source (e.g., battery) and can be custom-encoded by the manufactures or be encoded using industry specifications. An NFC reader can transmit a carrier signal (e.g., at 13.56 MHz) during reception. The carrier signal can provide energy to power the NFC tag. The NFC tag transmits data to the NFC reader by modulating the carrier signal with the data. The receiver circuit of the NFC reader has to demodulate the NFC tag response in the presence of its own transmit (TX) carrier signal.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects, the subject technology is directed to short range transceivers and in particular, to high dynamic range near-field communication (NFC) reader mode (RM) receivers. The subject technology provides the high dynamic range by cancelling a reader transmit (TX) carrier signal at the receiver, as described in more detail herein. The TX carrier signal is significantly stronger than the NFC tag signal, thereby requiring a high receiver dynamic range. This can be achieved, for example, by changing the phase of the carrier signal by 180° and feeding the phase-changed carrier signal into the mixer input of the receiver to suppress or substantially reduce the carrier signal and allow a high dynamic range.

Figure 1:
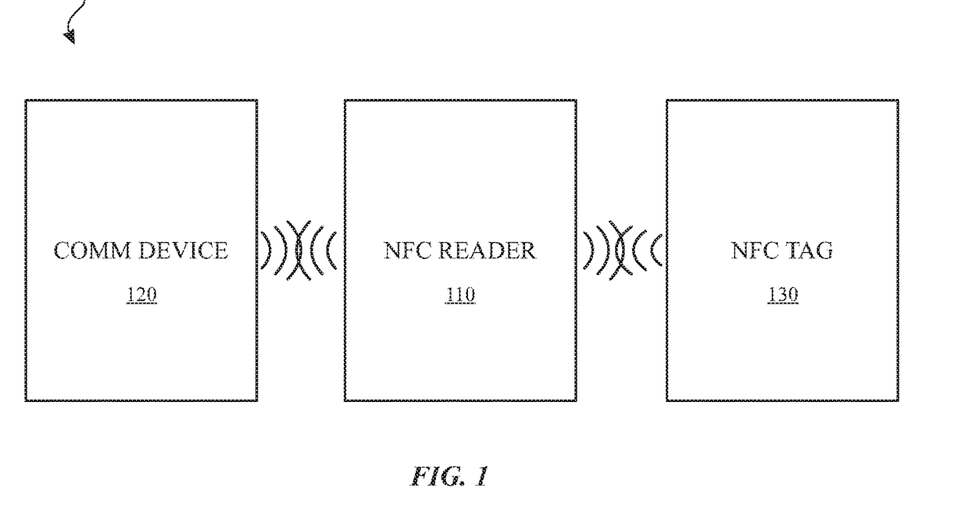
FIG. 1 is a high-level diagram illustrating an environment within which the subject technology may be implemented.

FIG. 1 is a high-level diagram illustrating an environment 100 within which the subject technology may be implemented. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an NFC reader 110, a communication device 120, and an NFC tag 130. In one or more embodiments, the NFC reader 110 can be other passive communication devices. Examples of the communication device 120 may include a portable communication device (e.g., a cell phone, a smart phone, a smart watch, a tablet, a phablet and the like), and personal computing systems. In some aspects, the NFC reader 110 can be a portable communication device or can be integrated with a portable communication device. The communication device 120 is NFC enabled and can communicate in NFC mode enabled by electromagnetic induction between, for example, two loop antennas of the two communication devices. The NFC connection between the NFC reader 110 and the communication device 120 can be an NFC peer-to-peer connection that enables two devices to communicate with each other and exchange information in an adhoc fashion. The NFC reader 110 may further include application software or firmware to operate in an NFC card emulation mode, for example, to function as a smart card, allowing a user to perform transactions such as payment or ticketing when communicating with an NFC-compliant apparatus, such as an NFC payment terminal.

The NFC reader 110 can operate in an NFC read and/or write mode when communicating with the NFC tag 130. In the NFC read and/or write mode, the NFC reader 110 can read information stored in the NFC tag 130 that can be embedded in, for example, a label or a smart poster. In one or more embodiments, the subject technology pertains to the NFC read and/or write mode of operation of the NFC reader 110. As an NFC reader, the NFC reader 110 transmits a carrier signal (e.g., at about 13.56 MHz) during reception. The carrier signal provides energy to power the NFC tag 130, as the NFC tag 130 does not include a power source. The NFC tag 130 can transmit data to the NFC reader 110 by modulating the carrier signal with the data. The NFC reader 110 can demodulate the signal from the NFC tag 130 to derive the data.

Figure 2:
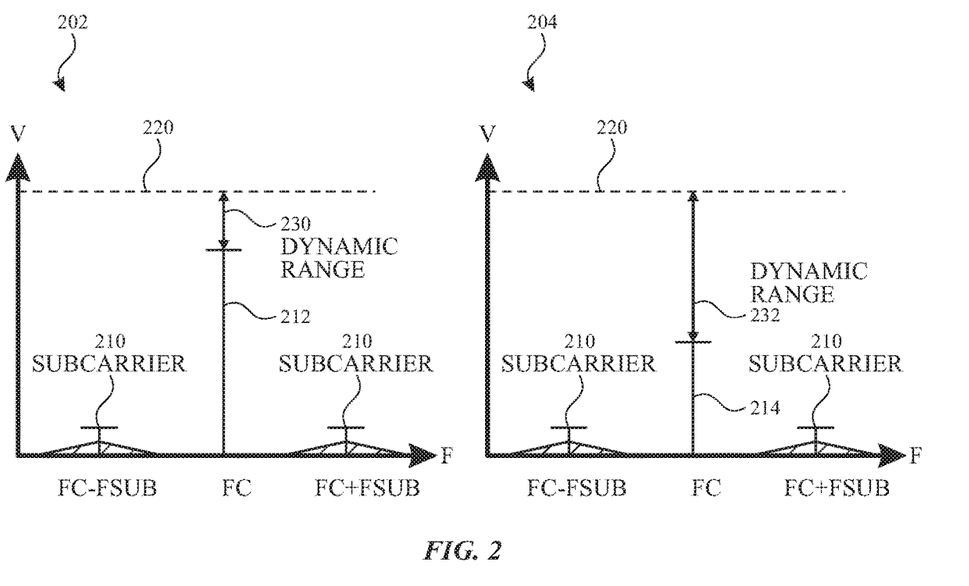
FIG. 2 is a set of charts illustrating a receiver dynamic range enhancement, in accordance with one or more aspects of the subject technology.

FIG. 2 is a set of charts 202 and 204 illustrating a receiver dynamic range enhancement, in accordance with one or more aspects of the subject technology. As discussed above, the NFC reader 110 of FIG. 1 can communicate with an NFC tag (e.g., 130 of FIG. 1) in an NFC read and/or write mode. The NFC reader 110 transmits a carrier signal at a carrier frequency ($f_c$) (e.g., at about 13.56 MHz) to the NFC tag 130. The NFC tag 130 modulates the carrier signal with data and transmits the modulated signal to the NFC reader 110. The frequency spectrum of the signal, as received at the NFC reader 110 before implementing the subject technology, is depicted in the chart 202, which shows the carrier signal 212 and two subcarriers 210 at frequencies of $f_c$-$f_{sub}$ (e.g., about 12.712 MHz) and $f_c$+$f_{sub}$ (e.g., about 14.408 MHz). The difference between the amplitude of the carrier signal 212 and the 1 dB compression level 220 of the NFC reader 110 is the dynamic range 230. The amplitude of the carrier signal 212 (e.g., about 5-10 V) is from the modulated signal transmitted by the NFC tag 130 and partially due to the unmodulated carrier signal (transmitted by the NFC reader 110) reaching the receiving input of the NFC reader 110, which can drastically affect the dynamic range of the NFC reader 110.

The subject technology suppresses or substantially reduces the contribution of the unmodulated transmitted carrier signal that reaches the input port of the NFC reader 110, as discussed in more details herein. The effect of suppressing the unmodulated transmitted carrier signal at the input port of the NFC reader 110 is the increased dynamic range 232, as shown in the chart 204, due to the decreased amplitude of the carrier signal 214 achieved after implementation of the subject technology. In some aspects, the amount of increased dynamic range may be about 20 dB, which can amount to the same increase (e.g., about 20 dB) in the receiver gain range.

Figure 3:
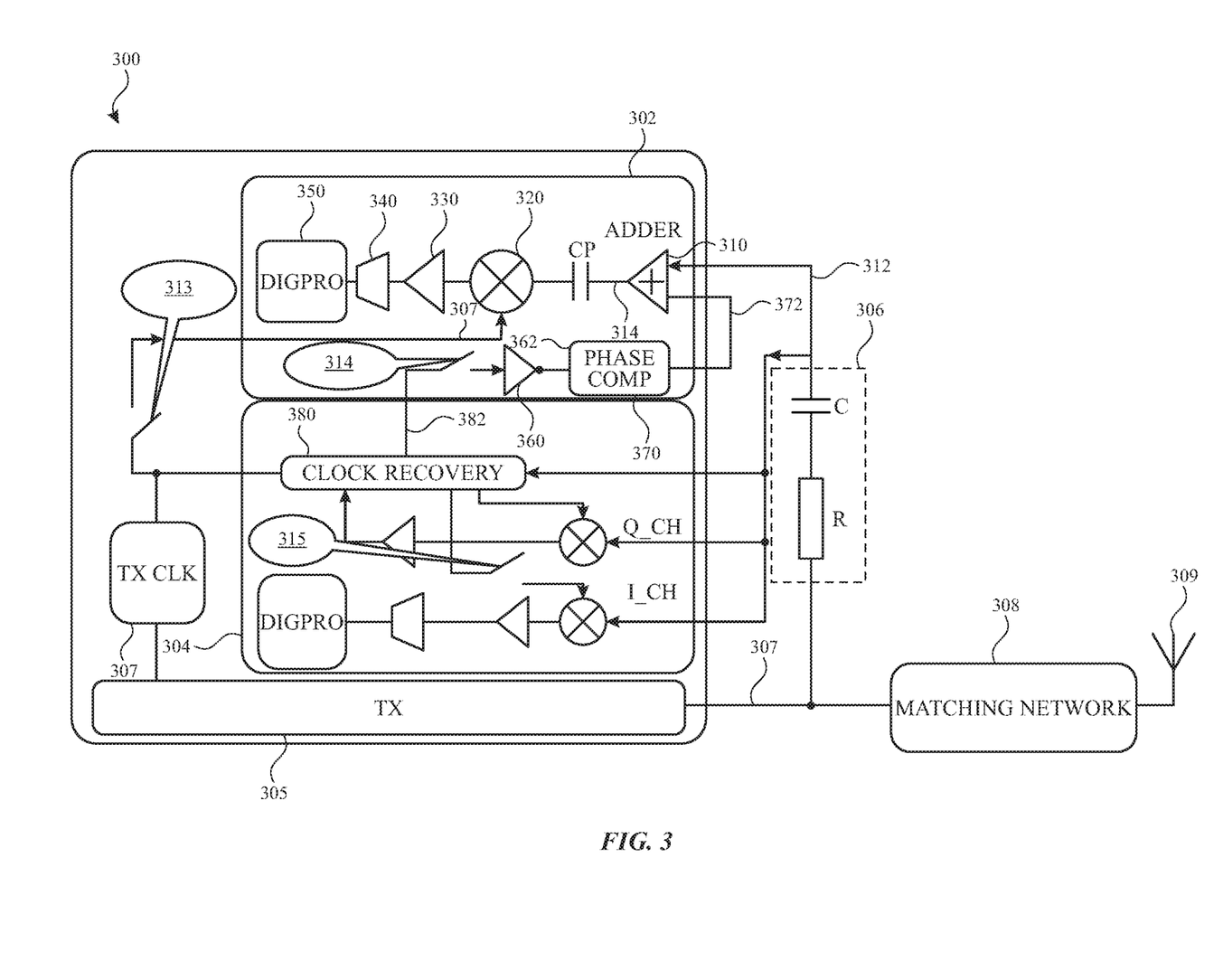
FIG. 3 is a schematic diagram illustrating an example implementation of a transceiver with a dynamic range enhanced receiver, in accordance with one or more aspects of the subject technology.

FIG. 3 is a schematic diagram illustrating an example implementation of a transceiver 300 with a dynamic range enhanced receiver, in accordance with one or more aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The transceiver 300 is an example implementation of the NFC reader 110. The transceiver 300 includes a reader mode (RM) receiver 302, a card mode (CM) receiver 304, a transmitter 305, a DC blocker 306 (e.g., made of a resistor R and a capacitor C), a known matching network 308 and an antenna 309. The matching network 308 and the antenna 309 may be referred to as an antenna circuit. The transceiver 300 further includes switches 313, 314 and 315. In reader mode receiving, the switches 313 and 314 are closed, switch 315 is open, and the CM receiver 304 is disabled. The switch 315 closes in card mode receiving, while switches 313 and 314 are open, the RM receiver 302 is disabled and the CM receiver 304 is enabled.

The RM receiver 302 includes a mixer 320, baseband amplifier 330, an analog-to-digital converter (ADC) 340 and a digital processor 350, which are present in many RM receivers. The mixer 320 uses as a local oscillator (LO) the TX clock signal 307 to down-convert a received signal to a baseband signal, which is amplified by the baseband amplifier 330 and converted to a digital baseband signal by the ADC 340. The digital baseband signal is then further processed by the digital processor (also known as baseband processor) 350. The TX clock signal 307 is generated by the transmitter 305 and used by the mixer 320 (e.g., in the RM, when switch 313 is closed).

The RM receiver 302 can be a zero-intermediate-frequency (IF) receiver (also referred to as homodyne receiver), in which the mixer 320 directly down-converts the received signal to baseband without converting to an IF signal first. The RM receiver 302 may include additional components such as the adder circuit 310, the inverter 360, and the phase compensation block (also referred to as a phase controller) 370, which are responsible for implementing particular features of the subject technology. The additional components provide for the enhanced dynamic range of the RM receiver 302 by suppressing the unmodulated transmit (TX) carrier, as described herein. The inverter 360 inverts the TX clock signal derived from a clock recovery circuit 380. The inverted TX clock (e.g., having an approximately 180° phase shift with respect to the TX clock) is processed by a phase compensation block 370 (also referred to as a phase controller) to form an inverted carrier signal 372.

The transmitter 305 generates and transmits a carrier signal, which is the TX clock signal 307, to an NFC tag (e.g., NFC tag 130 of FIG. 1) through a matching network 308 and the antenna 309. The NFC tag modulates the TX clock signal 307 to generate a modulated carrier signal and transmits the modulated carrier signal to the transceiver 300. The modulated carrier signal appears at an input port of the adder circuit 310 as the received signal 312, which is summed with the inverted carrier signal (also referred to as a second signal) 372 to produce a first signal 314. The purpose of the inverted carrier signal 372 is to cancel out or substantially reduce an unmodulated carrier signal that is included in the received signal 312. The origin of the unmodulated carrier signal is the transmitter 305. In operation, a portion of the TX clock signal 307 travels through the DC blocker 306 to the RM receiver 302, which is referred to as the unmodulated carrier signal, as the rest of the received signal 312 is modulated carrier signal received from the NFC tag (e.g., 130 of FIG. 1).

The unmodulated carrier signal is the component of the received signal 312 that has to be cancelled out by the adder circuit 310 before reaching to the mixer 320. The unmodulated carrier signal has the same frequency as the TX clock signal 307, but can experience a fixed phase shift ($\phi$) (or time delay) while reaching the adder circuit 310 through the DC blocker 306. The inverted carrier signal 372, in order to be able to cancel the unmodulated carrier signal, has to have a phase shift substantially equal to ϕ, which is provided by the phase compensation block 370. Therefore, the inverted carrier signal 372 has almost the same phase shift (e.g., ϕ) (or time delay) plus about 180° (due to inversion) as compared to the unmodulated carrier signal. Thus the inverted carrier signal 372 can readily cancel out or substantially reduce the unmodulated carrier signal component of the received signal 312 when summed with the received signal 312 via the adder circuit 310. This results in the first signal 314 at the input of the mixer 320 having almost no contribution or a negligible contribution from the unmodulated carrier signal. This is turns translates into an enhanced dynamic range of the RM receiver 302, as shown by chart 204 of FIG. 2 and described above.

The CM receiver 304 includes an in-phase (I)-channel (I_ch) and a quadrature (Q)-channel (Q_ch). The I-channel is enabled (through switch 315) while the CM receiver 304 is receiving. The Q-channel is always enabled and the Q-channel clock signal (e.g., LO) is provided by the clock recovery circuit 380. The clock recovery circuit 380 receives the TX clock signal 307 and performs carrier recovery to generate LO signal for the I-channel and the Q-channel mixers, as well as the clock signal 382.

Figure 4:
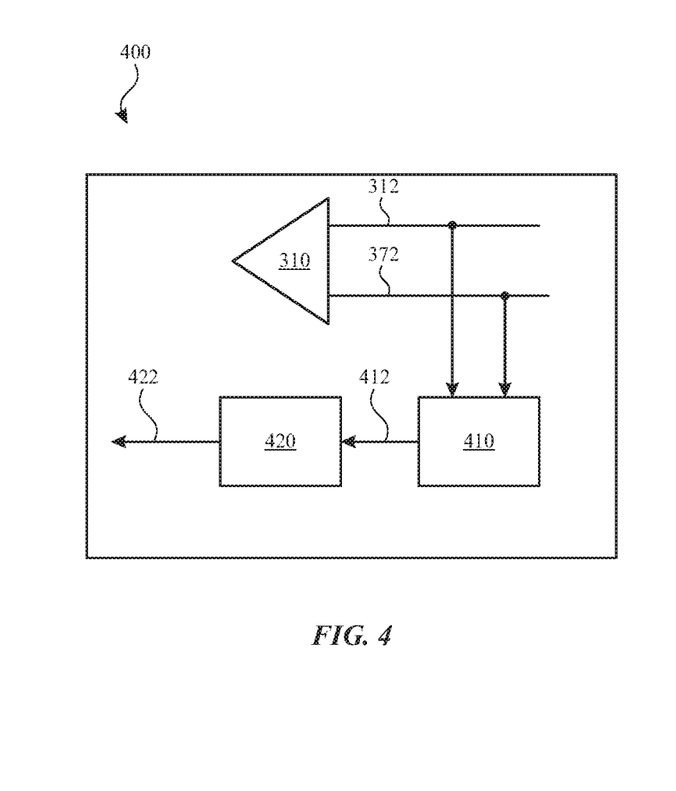
FIG. 4 is a block diagram illustrating an example circuit for dynamic phase adjustment of a clock signal, in accordance with one or more aspects of the subject technology.

FIG. 4 is a block diagram illustrating an example circuit 400 for dynamic phase adjustment of a clock signal, in accordance with one or more aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The phase compensation as performed, for example, by the phase compensation block 370 of FIG. 3 can be performed dynamically to compensate for time variation of the phase shift of the received signal 312. The time variations can be due to a number of factors such as electromagnetic interference. For example, when a metallic object approaches the antenna 309 of FIG. 3, the electromagnetic field around the antenna 309 may be affected in a way to cause a variation of a phase of the received signal 312.

The dynamic phase adjustment of the TX clock signal (e.g., 382 of FIG. 3) can be performed, for example, in two ways. In one implementation, the dynamic phase adjustment of the TX clock signal can be performed by a measured phase difference using the circuit 400 shown in FIG. 4. The circuit 400 includes the adder circuit 310, a phase comparator circuit 410 and a low-pass filter (LPF) 420. The phase comparator circuit 410 compares the phases of the received signal 312 and the inverted carrier signal 372 and generates an output signal 412 (e.g., a measured phase difference) based on the result of the comparison. For example, when the received signal 312 and the inverted carrier signal 372 have almost equal phases, the output signal 412 would be almost zero. The output signal 412 is passed through the LPF 420 to remove high frequency noise. The filtered signal 422 is then fed back to the phase compensation block 370. The feedback signal (e.g., filtered signal 422) allows the phase compensation block 370 to suitably adjust the phase of the inverted signal 362 of FIG. 3, such that cancellation or amplitude reduction of the unmodulated carrier signal by the inverted carrier signal 372 can be done in spite of the time variable drifts in phase of the received signal 312.

In one or more implementations, the dynamic adjustment of the phase of the TX clock signal can be performed based on a feedback from an automatic gain control (AGC) circuit. The AGC circuit can be realized, for example, in the baseband amplifier 330 of FIG. 4. The AGC signal from the AGC circuit can be fed back to the phase compensation block 370 for dynamic phase adjustment of the TX clock signal.

Figure 5:
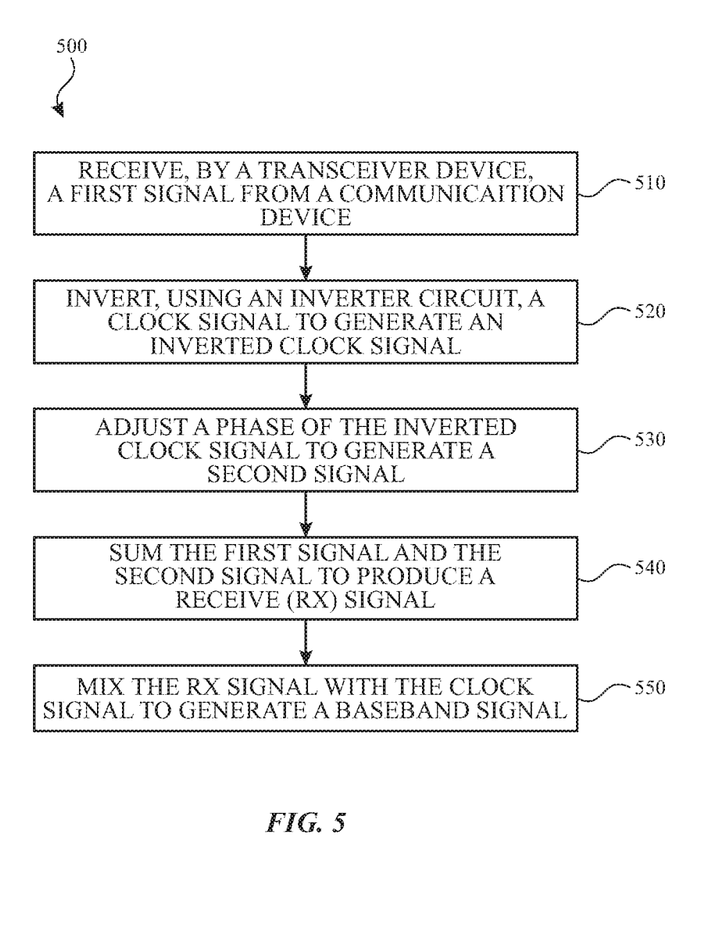
FIG. 5 is a flow diagram illustrating a process for canceling transmit (TX) carrier signal at a receiver, in accordance with one or more aspects of the subject technology.

FIG. 5 is a flow diagram illustrating a process 500 for canceling transmit (TX) carrier signal at a receiver (e.g., 302 of FIG. 3), in accordance with one or more aspects of the subject technology. For explanatory purposes, the process 500 is primarily described herein with reference to the transceiver 300 of FIG. 3. However, the process 500 is not limited to the transceiver 300 of FIG. 3, and one or more blocks (or operations) of the process 500 may be performed by one or more other components of the transceiver 300. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The process 500 begins with receiving, by a transceiver device (e.g., 300 of FIG. 3), a first signal (e.g., 312 of FIG. 3) from a first communication device (e.g., 130 of FIG. 1) (510). A clock signal (e.g., 382, of FIG. 3) is inverted, using an inverter circuit (e.g., 360, of FIG. 3), to generate an inverted clock signal (e.g., 362, of FIG. 3) (520). A phase of the inverted clock signal is adjusted to generate a second signal (e.g., 372, of FIG. 3) (530). The first signal and the second signal are summed (e.g., by 310, of FIG. 3) to produce a receive (RX) signal (e.g., 314 of FIG. 3) (540). The RX signal is mixed with the clock signal (e.g., 307 of FIG. 3) to generate a baseband signal (550). In one or more implementations, the first signal is produced by the first communication device (e.g., 130 of FIG. 1) by modulating with data the clock signal received from the transceiver device.

Figure 6:
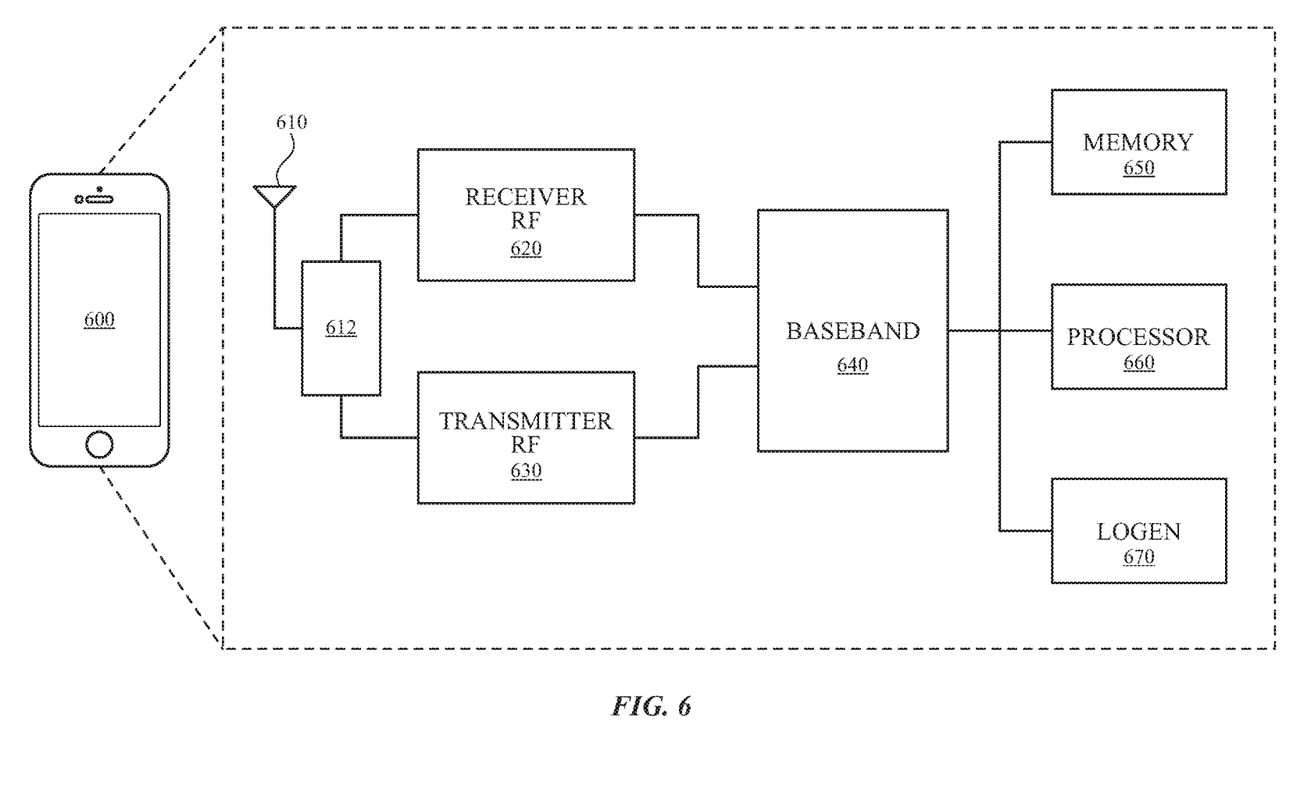
FIG. 6 is a block diagram illustrating an example wireless communication device, within which one or more aspects of the subject technology can be implemented.

FIG. 6 is a block diagram illustrating an example wireless communication device 600, within which one or more aspects of the subject technology can be implemented. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The wireless communication device 600 may include a radio-frequency (RF) antenna 610, a receiver 620, a transmitter 630, a baseband processing module 640, a memory 650, a processor 660, and a local oscillator generator (LO-GEN) 670. In various embodiments of the subject technology, one or more of the blocks represented in FIG. 6 may be integrated on one or more semiconductor substrates. For example, the blocks 620-670 may be realized in a single semiconductor chip or a single system on a semiconductor chip, or may be realized in a multi-semiconductor chip semiconductor chipset.

The receiver 620 may include suitable logic circuitry and/or code that may be operable to receive and process signals from the RF antenna 610. The receiver 620 may, for example, be operable to amplify and/or down-convert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards, Wi-Fi, WiMAX, Bluetooth, near-filed communication (NFC) and various cellular standards. In various embodiments of the subject technology, the receiver 620 may not require any SAW filters and few or no off-semiconductor chip discrete components such as large capacitors and inductors.

The transmitter 630 may include suitable logic circuitry and/or code that may be operable to process and transmit signals from the RF antenna 610. The transmitter 630 may, for example, be operable to up-convert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, Bluetooth, NFC and various cellular standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer may be operable in multiple frequency bands of various wireless standards.

The baseband processing module 640 may include suitable logic, circuitry, interfaces, and/or code that may be operable to perform processing of baseband signals. The baseband processing module 640 may, for example, analyze received signals and generate control and/or feedback signals for configuring various components of the wireless communication device 600, such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may include suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfers of data between various portions of the wireless communication device 600. Additionally, the processor 660 may enable implementation of an operating system or otherwise execute code to manage operations of the wireless communication device 600. In some aspects, the processor 660 may partially or entirely perform functionalities of the digital processor 350 of FIG. 3.

The memory 650 may include suitable logic, circuitry, and/or code that may enable storage of various types of information such as received data, generated data, code, and/or configuration information. The memory 650 may include, for example, RAM, ROM, flash, and/or magnetic storage. In various embodiment of the subject technology, information stored in the memory 650 may be utilized for configuring the receiver 620 and/or the baseband processing module 640.

The local oscillator generator (LOGEN) 670 may include suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is desired to receive signals. Wireless signals may be received via the RF antenna 610 and amplified and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode, and perform other processing on audio, video, and/or control signals to be transmitted by the transmitter 630 in accordance with various wireless standards.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A transceiver comprising:
a transmitter circuit configured to generate a transmit (TX) signal for communication to a first device via an antenna; and
a receiver circuit in communication with the first device via the antenna, the receiver circuit comprising:
a mixer circuit configured to mix a carrier signal with a first signal and to generate a baseband signal; and
an adder circuit coupled to the antenna and configured to produce the first signal by adding a receive (RX) signal with a second signal to reduce a component of the TX signal included in the RX signal,
wherein the second signal comprises an inverted carrier signal that is produced by processing a TX clock signal generated by the transmitter circuit.

2. The transceiver of claim 1, wherein the receiver circuit comprises a zero intermediate-frequency (IF) receiver, and wherein the transceiver further comprises an inverter configured to invert the TX clock signal to produce an inverted TX clock signal.

3. The transceiver of claim 2, further comprising a phase control circuit configured to adjust a phase of the inverted TX clock signal by a phase adjustment to generate the second signal, wherein, the phase adjustment comprises a substantially fixed phase change.

4. The transceiver of claim 3, wherein the phase control circuit is configured to dynamically adjust the phase based on a feedback from an automatic gain control (AGC) circuit.

5. The transceiver of claim 3, further comprising a phase comparator coupled to input ports of the adder circuit and configured to measure a phase difference between the RX signal and the second signal.

6. The transceiver of claim 5, wherein the phase control circuit is configured to dynamically adjust the phase based on a measured phase difference between the RX signal and the second signal.

7. The transceiver of claim 1, wherein the carrier signal comprises the TX clock signal.

8. The transceiver of claim 1, wherein the transceiver comprises a near-field communication (NFC) transceiver, and wherein the receiver circuit comprises a reader mode (RM) receiver.

9. The transceiver of claim 1, wherein the first device comprises an NFC tag, wherein the NFC tag is powered by the TX signal.

10. The transceiver of claim 9, wherein the RX signal includes a tag signal transmitted by the NFC tag, and wherein the tag signal comprises the TX signal modulated with tag data.

11. A communication system comprising:
a transmitter circuit configured to transmit a carrier signal to a passive device via an antenna circuit; and
a receiver circuit configured to receive tag data from the passive device, the receiver circuit comprising:
an adder circuit coupled to the antenna circuit and configured to produce a first signal by adding a receive (RX) signal with a second signal;
a mixer configured to mix the first signal with the carrier signal to generate a baseband signal; and
a phase processing circuit configured to process the carrier signal to generate the second signal that comprises an inverted carrier signal.

12. The communication system of claim 11, wherein the passive device comprises a near-filed communication (NFC) tag configured to derive power from the carrier signal and to modulate the carrier signal using the tag data.

13. The communication system of claim 11, wherein the mixer comprises a zero intermediate-frequency (IF) mixer, and wherein the phase processing circuit comprises an inverter and a phase compensation circuit.

14. The communication system of claim 13, wherein the carrier signal comprises a transmit (TX) clock signal, and wherein the inverter is configured to invert the TX clock signal to produce an inverted TX clock signal.

15. The communication system of claim 14, wherein the phase compensation circuit is configured to adjust a phase of the inverted TX clock signal to generate the second signal, and wherein a phase adjustment comprises a substantially fixed phase change.

16. The communication system of claim 15, wherein, the phase compensation circuit is further configured to dynamically adjust the phase of the inverted TX clock signal using a feedback signal from an automatic gain control (AGC) circuit.

17. The communication system of claim 15, wherein the phase compensation circuit is further configured to dynamically adjust the phase of the inverted TX clock signal using a measured phase difference.

18. The communication system of claim 17, further comprising a phase comparator coupled to input ports of the adder circuit and configured to compare a first phase the RX signal with a second phase the second signal and to generate the measured phase difference based on a comparison result.

19. A method comprising:
receiving, by a transceiver device, a first signal from a first communication device;
inverting, using an inverter circuit, a clock signal to generate an inverted clock signal;
adjusting a phase of the inverted clock signal to generate a second signal, wherein the second signal comprises an inverted carrier signal;
summing the first signal and the second signal to produce a receive (RX) signal; and
mixing the RX signal with the clock signal to generate a baseband signal,
wherein the first signal is produced by the first communication device by modulating with data the clock signal received from the transceiver device.

20. The method of claim 19, further comprising dynamically adjusting the phase of the inverted clock signal based on at least one of a feedback signal from an automatic gain control (AGC) circuit or a measured phase between the first signal and the second signal.

* * * * *